United States Patent [19]

Miyashita

[11] Patent Number: 5,050,914
[45] Date of Patent: Sep. 24, 1991

[54] UNION JOINT

[75] Inventor: Tomio Miyashita, Yokohama, Japan

[73] Assignee: Sanko Kogyo Kabushiki Kaisha, Tokyo, Japan

[21] Appl. No.: 605,260

[22] Filed: Oct. 26, 1990

[30] Foreign Application Priority Data

Apr. 9, 1990 [JP] Japan .................................. 2-93389

[51] Int. Cl.⁵ ............................................ F16L 17/06
[52] U.S. Cl. .................................... 285/336; 285/379; 285/917
[58] Field of Search ................ 285/336, 379, 380, 917

[56] References Cited

U.S. PATENT DOCUMENTS 3,298,719  1/1967  Bills et al. ............................ 285/336

Primary Examiner—Dave W. Arola
Attorney, Agent, or Firm—Flynn, Thiel, Boutell & Tanis

[57] ABSTRACT

A union joint capable of connecting two pipes in a perfectly sealed joint. The union joint comprises a first sleeve hermetically joined to a first pipe, a second sleeve hermetically joined to a second pipe, a metallic gasket interposed between the first and second sleeves so as to be compressed between the respective pressing surfaces of the first and second sleeves when the first and second sleeves are drawn axially toward each other and a coupling nut combined with the first sleeve so as to be screwed on the second sleeve to draw the first and second sleeves axially toward each other. Grooves having a shape substantially conforming to the external shape of the metallic gasket are formed respectively in the respective end surfaces of the first and second sleeves, a retaining member for retaining the metallic gasket in place is detachably put on either the first or second sleeve, and the retaining member has a limiting portion which engages the end surfaces of the first and second sleeves to limit the compressin of the metallic gasket when the first and second sleeves are drawn axially toward each other. The retaining member holds the metallic gasket in place in assembling the union joint to facilitate assembling the union joint. The bottom surfaces of the grooves can be easily burnished to secure perfect sealing contact between the bottom surfaces of the grooves and the metallic gasket.

3 Claims, 4 Drawing Sheets

FIG. 2
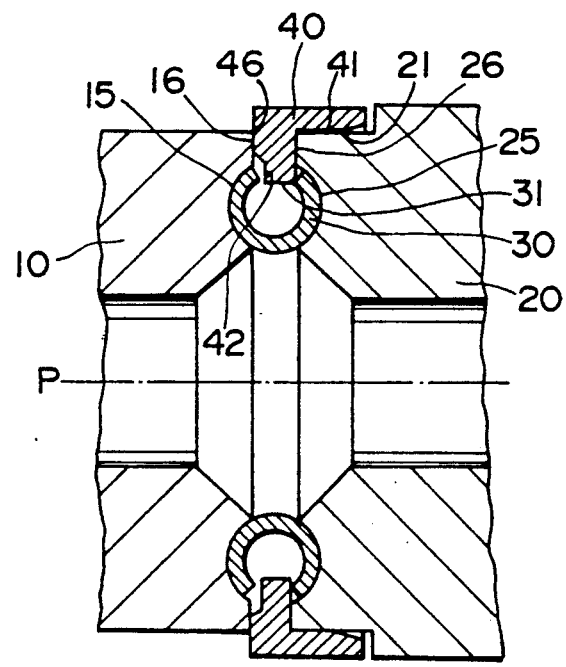
FIG. 3(A)  FIG. 3(B)
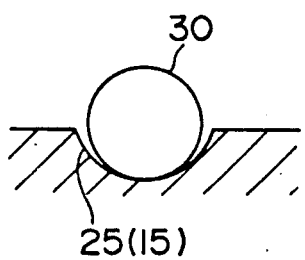 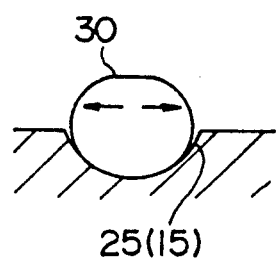

UNION JOINT

BACKGROUND OF THE INVENTION

1. Field of the Invention

The present invention relates to a union joint and, more particularly, to a union joint for use in semiconductor industries requiring perfectly sealed connection of pipes.

2. Prior Art

Semiconductor device manufacturing processes for manufacturing semiconductor devices, such as ICs and LSIs, are carried out in clean rooms in which elaborate precautions are employed to reduce dust particles and other contaminants in the air. A special gas for use in the clean room is supplied through piping from an external gas source. The special gas must be extremely pure and the existence of foreign gasses, such as air, in the special gas must be perfectly obviated. Therefore, the piping for supplying the special gas must be formed of precision pipes and precision union joints for connecting the pipes. Union joints to be used in combination with high-pressure vessels also must be capable of perfect sealing in view of safety.

The perfectly sealed connection of pipes by a conventional union joint may be attained by increasing pressure acting on a metallic gasket provided between the pipes. However, if an excessive torque is applied to the coupling ring to join pipes firmly, the pipes and a gasket interposed between the pipes are distorted torsionally, and hence the torque cannot be increased beyond a fixed limit.

The applicant of the present patent application proposed previously a union joint as shown in FIG. 4 incorporating a thrust bearing to transmit only an axial force from the inner surface of a coupling nut to one of two pipes and not to transmit torque from the inner surface of the coupling nut to the pipe in Japanese Patent Laid-Open Publication No. 62-75188. As shown in FIG. 4, the union joint consists of a first sleeve 10 attached in a sealed joint to a first pipe 1, a second sleeve 20 attached in a sealed joint to a second pipe 2, a metallic gasket 30 interposed between the pressing surface 15 of the first sleeve 10 and the pressing surface 25 of the second sleeve 20, a coupling nut 5 for axially drawing together the first sleeve 10 and the second sleeve 20 to join the first pipe 1 and the second pipe 2 hermetically, and a thrust bearing 8 placed between the inner bottom surface 6 of the coupling nut 5 and the shoulder of the first sleeve 10. When the coupling nut 5 is turned to draw together the first sleeve 10 and the second sleeve 20, hence the first pipe 1 and the second pipe 2, only an axial force acts on the first sleeve 10, so that the pipes 1 and 2 can be firmly joined together by applying a large torque to the coupling nut 5 without torsionally distorting the pipes 1 and 2 and the metallic gasket 30. In order to enhance the sealing effect of the union joint, the pressing surface 15 of the first sleeve 10 and the pressing surface 25 of the second sleeve 20 are mirror-finished and, to enhance the possibility of repetitive use, the pressing surfaces 15 and 25 are burnished. The metallic gasket 30 having excellent squeezing property, capable of securing residual elasticity, capable of functioning without contaminating the gas and having excellent durability can be used repeatedly to meet economical requirements To reserve an appropriate residual elasticity of the metallic gasket 30, the compression of the metallic gasket 30 between the sleeves 10 and 20 must be within a limited range. To limit the compression of the metallic gasket 30, the sleeves 10 and 20 are provided respectively with limiting surfaces 16 and 26. To locate the metallic gasket 30 correctly between the sleeves 10 and 20, a gasket chamber S surrounded by a side wall 28 is formed in the second sleeve 20. In a sate shown in FIG. 4 before the coupling nut 5 is turned to fasten together the sleeves 10 and 20, the metallic gasket 30 is placed in the gasket chamber S and seated on the pressing surface 25 formed in the second sleeve 20, and the pressing surface 15 of the first piece is positioned opposite to the metallic gasket 30 in the gasket chamber S. When the coupling nut 5 is turned to draw the sleeves 10 and 20 axially toward each other, the metallic gasket 30 is compressed between the pressing surfaces 15 and 25 until the limiting surfaces 16 and 26 are brought into contact with each other.

This union joint, however, still needs further improvements. Since the pressing surface 15 of the first sleeve 10 is the end surface of a protruding portion of the first sleeve 10, the pressing surface 15 can be quickly and easily burnished. However, since the pressing surface 25 of the second sleeve 20 is the bottom surface of the recessed gasket chamber S, it is considerably difficult to burnish the pressing surface 25 and burnishing the pressing surface 25 increases the cost of the union joint. Since the metallic gasket 30 expands radially when compressed and the outer circumference of the metallic gasket 30 approaches the side surface 28 of the gasket chamber S, the entire area of the pressing surface 25 including the peripheral area contiguous with the side surface 28 must be burnished, which, however, is very difficult. Means for locating the metallic gasket 30 in a gasket holding space S' on the circumference 28' of the protruding end of the second sleeve 20 as shown in FIG. 7 also has the same problem in burnishing the pressing surface 25 on which the metallic gasket 30 is seated.

The union joint has problems in assembling and disassembling. In axially separating the sleeves 10 and 20 in a space where the pipes 1 and 2 cannot be axially moved after screwing the coupling nut 5 off the second sleeve 20, the pressing surfaces 15 and 25 need to be moved laterally with respect to an axis P, which, however, is impossible because part of the protruding end 18 of the first sleeve 10 is fitted in the gasket chamber S.

In some cases, minute radial flaws 50 as shown in FIGS. 5 and 6 are formed across a portion of the pressing surfaces 15 (25) to be in contact with the metallic gasket 30. Such a radial flaw 50 makes impossible to secure perfect sealing however great is the pressure applied to the metallic gasket 30, because the metallic gasket 30 does not cut into the radial flaw 50 and expands radially after the pressure applied to the metallic gasket 30 exceeds a certain level.

SUMMARY OF THE INVENTION

Accordingly, it is an object of the present invention to provide a union joint having pressing surfaces which can be readily burnished, and capable of being easily assembled, of being manufactured at a relatively low cost and of securing perfect sealed connection of pipes.

In one aspect of the present invention, a union joint comprises a first sleeve, a second sleeve, a metallic gasket interposed between the first and second sleeves so as to be compressed between the respective pressing surfaces of the first and second sleeves when the first and the second sleeves are drawn axially toward each other, a coupling nut for drawing the first and second sleeves axially toward each other, and is characterized in that grooves having a shape substantially conforming to the external shape of the metallic gasket are formed respectively in the respective pressing surfaces of the first and second sleeves, a retaining member for retaining the metallic gasket in place is detachably put on either the first or second sleeve, the metallic gasket has a cross section resembling the letter C, the retaining flange of the retaining member is inserted in the slit of the metallic gasket to retain the metallic gasket in place on the corresponding sleeve, and the retaining member has a limiting portion which engages the end surfaces of the first and second sleeves to limit the compression of the metallic gasket.

The metallic gasket can be retained securely on the sleeve by inserting the retaining flange of the retaining member in the slit of the metallic gasket and putting the retaining member on the sleeve, which facilitates work for assembling the union joint regardless of the position of the same. The metallic gasket expands radially and is brought into contact with the bottom surfaces of the grooves of the sleeves in wide areas when compressed by screwing the coupling nut on the sleeve so that the possibility of inclusion of radial flaws formed in the bottom surfaces of the grooves in the sealed contact areas is increased. The end surfaces of the sleeves come into contact with each other to limit the compression of the metallic gasket when the first and second sleeves are drawn axially toward each other, so that the metallic gasket is compressed properly.

The union joint can be readily disassembled by screwing the coupling nut off the sleeve, and the metallic gasket can be readily and quickly changed by laterally dislocating the sleeves relative to each other.

The above and other objects, features and advantages of the present invention will become more apparent from the following description taken in connection with the accompanying drawings.

BRIEF DESCRIPTION OF THE DRAWINGS

FIG. 2 is a cross sectional view of a modification of a retaining member;

FIGS. 3(A) and 3(B) are typical views of assistance in explaining the function and effect of a groove for receiving a metallic gasket;

DESCRIPTION OF THE PREFERRED EMBODIMENT

Figure 1:
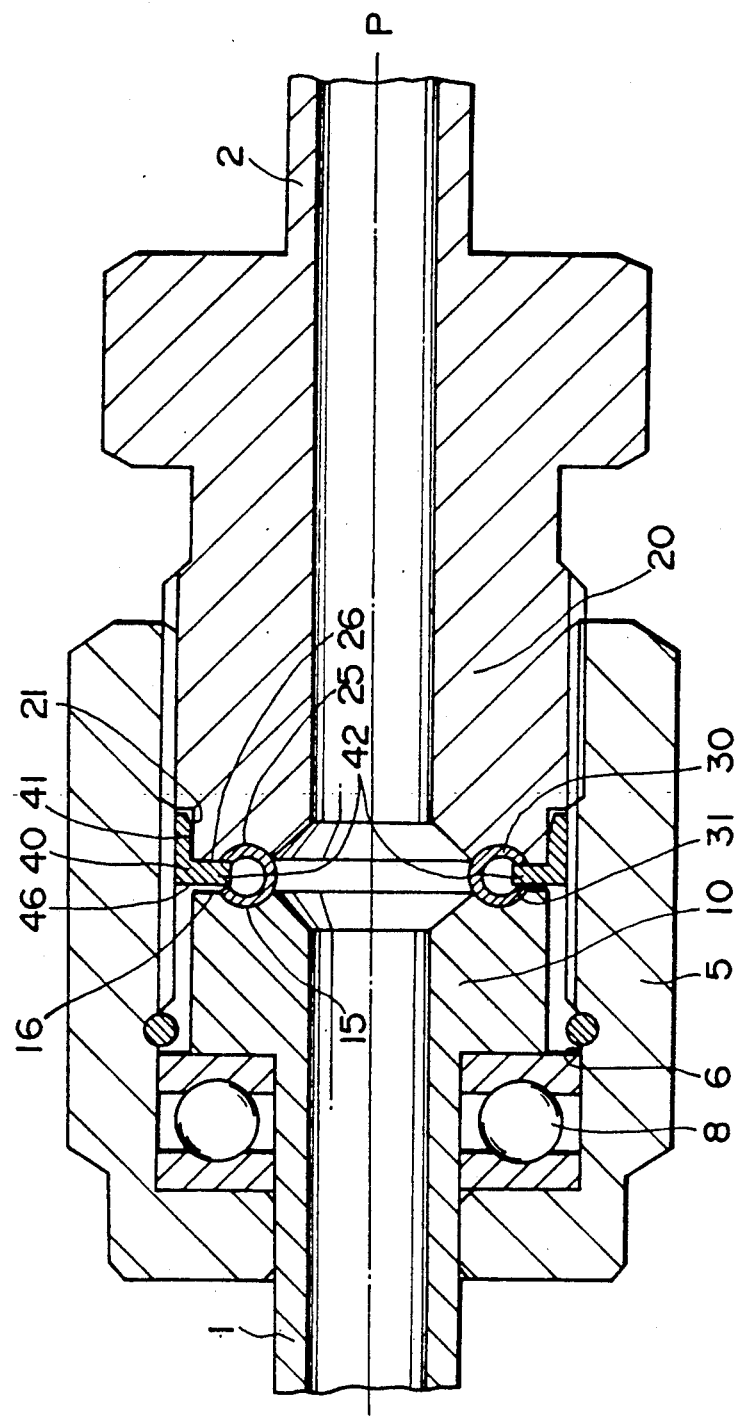
FIG. 1 is a longitudinal sectional view of a union joint in a preferred embodiment according to the present invention.
Figure 4:
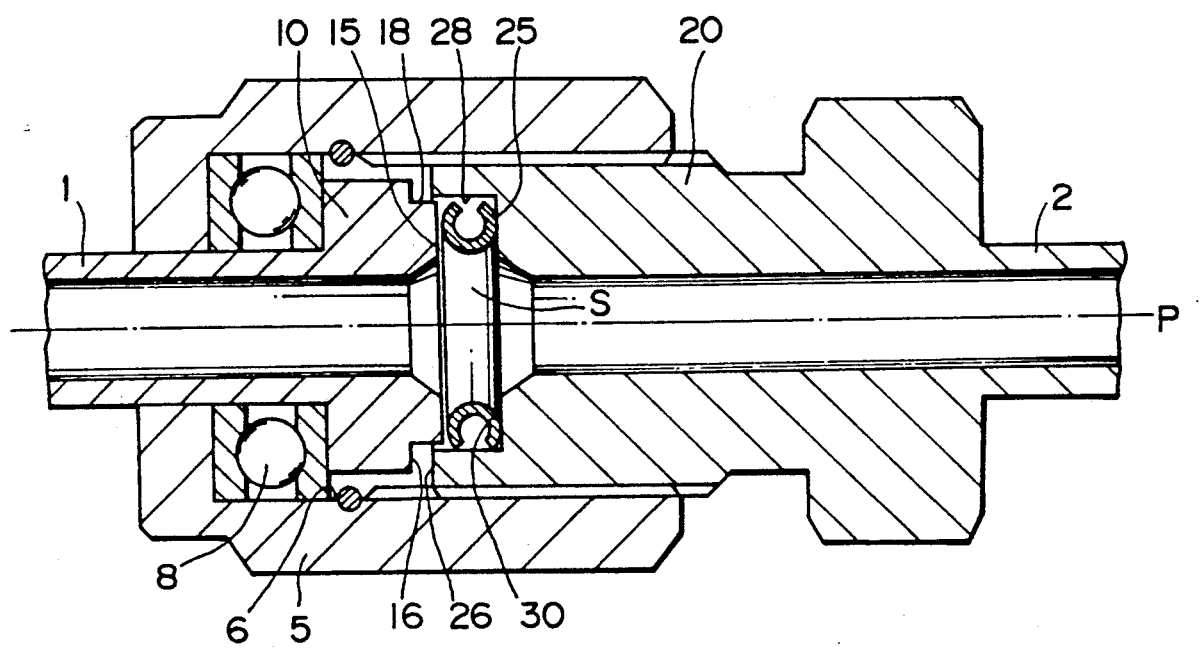
FIG. 4 is a longitudinal sectional view of a conventional union joint.
Figure 5:
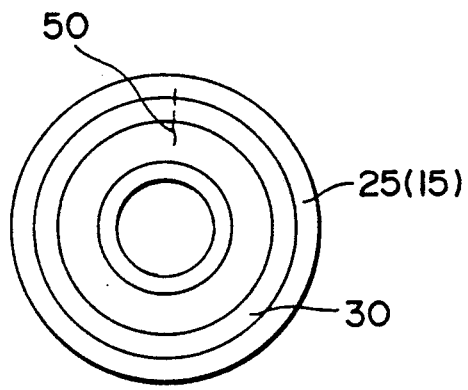
FIGS. 5 and 6 are views of assistance in explaining the adverse effect of flaws formed in the pressing surface of a union joint on the sealing effect of a metallic gasket.
Figure 6:
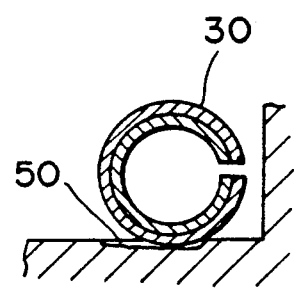
Figure 7:
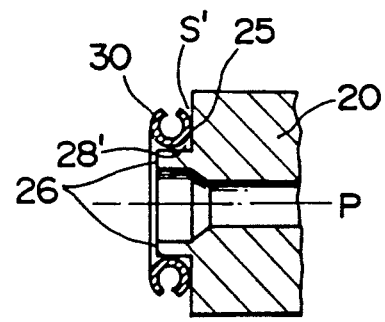
FIG. 7 is a fragmentary sectional view of a conventional union joint, showing another manner of holding a metallic gasket on a sleeve.

Referring to FIGS. 1 to 3, a union joint embodying the present invention comprises a first sleeve 10 hermetically joined to a first pipe 1, a second sleeve 20 hermetically joined to a second pipe 2, a coupling nut 5 combined with the first sleeve 10 so as to be screwed on the second sleeve 20 to draw the first sleeve 10 and the second sleeve 20 axially toward each other, a thrust bearing 8 placed between the inner flange of the coupling nut 5 and the shoulder of the first sleeve 10 to allow the coupling nut 5 to be turned without dragging the first sleeve 10, a metallic gasket 30 placed between the first sleeve 10 and the second sleeve 20, and a retaining member 40 having a retaining flange 42 inserted in the slit of the metallic gasket 30 and put on the reduced front end of the second sleeve 20 to retain the metallic gasket 30 in place on the second sleeve 20 and to limit the compression of the metallic gasket 30 when the first sleeve 10 and the second sleeve 20 are drawn axially toward each other.

Grooves 15 and 25 corresponding to pressing surfaces and conforming to the external shape of the metallic gasket 30 are formed respectively in the respective end surfaces 16 and 26 of the first sleeve 10 and the second sleeve 20 to receive the metallic gasket 30 therein. Since the grooves 15 and 25 are exposed the bottom surfaces of the grooves 15 and 25 can be easily burnished at a low cost.

When compressed, the metallic gasket 30 is pressed firmly to the bottom surfaces of the grooves 15 and 25 as shown in FIG. 3(A), and then the metallic gasket 30 is expanded radially as shown in FIG. 3(B) as the compressive pressure acting on the metallic gasket 30 increases, whereby the effective sealing area, namely, a contact area between the metallic gasket 30 and the grooves 15 and 25, is increased to increase the possibility of inclusion of flaws, if any, formed in the circumference of the metallic gasket 30 and the bottom surfaces of the grooves 15 and 25. The cross section of the grooves 15 and 25 may be of a semicircular shape or a shape resembling the letter V provided that the side surfaces of the metallic gasket 30 are able to come into close contact with the corresponding bottom surfaces of the grooves 15 and 25 when the metallic gasket 30 is compressed.

The bottom surfaces of the grooves 15 and 25 formed respectively in the end surfaces 16 and 26 of the sleeves 10 and 20 can be easily burnished.

The retaining member 40 is put on the reduced end 21 of the second sleeve 20, and the retaining flange 42 is inserted in the slit of the metallic gasket 30 to retain the metallic gasket 30 in place in the groove 25 of the second sleeve 20. A compression limiting portion 46 is formed in the retaining flange 42 of the retaining member 40. When the sleeves 10 and 20 are drawn axially toward each other by the coupling nut 5, the compression limiting portion 46 is held between the respective end surfaces 16 and 26 of the sleeve 10 and 20 to limit the further compression of the metallic gasket 30. Thus, the compression of the metallic gasket 30 is dependent on the thickness of the compression limiting portion 46 of the retaining member 40. The retaining member 40 may be replaced with other retaining member of dimensions different from the former to adjust the compression of the metallic gasket 30.

Although the invention has been been described in its preferred form with a certain degree of particularly, obviously many changes and variations are possible therein. It is therefore to be understood that the present invention may be practiced otherwise than as specifically described herein without departing from the scope and spirit thereof.

What is claimed is:

1. A union joint comprising:

a first sleeve to be joined hermetically to a first pipe;
a second sleeve to be joined hermetically to a second pipe; each said sleeve having an end surface;
a compressible metallic gasket interposed between said first and second sleeves so as to be compressed between respective opposed end surfaces of said first and second sleeves when said first and second sleeves are drawn axially toward each other; one of said sleeves having threads thereon;
a coupling nut combined with one of said sleeves and capable of being threaded on said other sleeve to draw said first and second sleeves axially toward each other;
characterized in that grooves having a shape substantially conforming to the external shape of said metallic gasket are formed respectively in said respective end surfaces of said first and second sleeves, said compressible metallic gasket received in said grooves, a retaining member for retaining said metallic gasket in place being detachably mounted on one of said first or second sleeves, said retaining member having a retaining flange said metallic gasket having a partly open cross section resembling the letter C, said retaining flange of said retaining member being received inside said partly open cross section of said metallic gasket to retain said metallic gasket in place on the corresponding sleeve, and said retaining member having a limiting portion which engages said end surfaces of said first and second sleeves to limit the compression of said metallic gasket when said first and second sleeves are drawn axially toward each other by said coupling nut.

2. A union joint according to claim 1, wherein said metallic gasket and said retaining member are of annular construction, said retaining member radially surrounding said metallic gasket, said retaining member having a generally L-shaped cross section including a first axially extending leg and a second radially extending leg, said first axially extending leg being spaced radially outwardly from said metallic gasket and being detachably sleeved on an outer peripheral surface of the associated said sleeve, said second leg extending radially inwardly from said first leg and being interposed axially between said end surfaces of said sleeves, said retaining flange received inside said partly open cross section being defined by a radially inner free end of said second leg, and said limiting portion of said retaining member being defined on said second leg between said free end portion and said first leg.

3. A union joint according to claim 2, wherein said free end portion of said second leg has a smaller axial dimension than the remainder of said second leg so that said retaining flange is axially thinner than said limiting portion.

* * * * *